(12) United States Patent
Ngo et al.

(10) Patent No.: US 10,805,113 B2
(45) Date of Patent: Oct. 13, 2020

(54) APPLICATION TRANSMISSION CONTROL PROTOCOL TUNNELING OVER THE PUBLIC INTERNET

(71) Applicant: DH2I COMPANY, Fort Collins, CO (US)

(72) Inventors: Thanh Q. Ngo, Oregon City, OR (US); Samuel Revitch, Portland, OR (US)

(73) Assignee: DH2I COMPANY, Fort Collins, CO (US)

( * ) Notice: Subject to any disclaimer, the term of this patent is extended or adjusted under 35 U.S.C. 154(b) by 0 days.

(21) Appl. No.: 16/532,727

(22) Filed: Aug. 6, 2019

(65) Prior Publication Data

US 2020/0052927 A1 Feb. 13, 2020

Related U.S. Application Data

(60) Provisional application No. 62/715,361, filed on Aug. 7, 2018, provisional application No. 62/715,367, filed on
(Continued)

(51) Int. Cl.
*H04L 12/46* (2006.01)
*H04L 29/06* (2006.01)
(Continued)

(52) U.S. Cl.
CPC .......... *H04L 12/4633* (2013.01); *G06F 9/547* (2013.01); *H04L 9/088* (2013.01);
(Continued)

(58) Field of Classification Search
CPC ... H04L 12/4633; H04L 9/088; H04L 63/029; H04L 12/66; H04L 67/10; H04L 67/141;
(Continued)

(56) References Cited

U.S. PATENT DOCUMENTS 8,234,702 B2 7/2012 Maes
8,990,901 B2 3/2015 Aravindakshan
(Continued)

FOREIGN PATENT DOCUMENTS

EP 3198464 A1 3/2016
WO 2016049609 A1 3/2016

OTHER PUBLICATIONS

Tschofenig, H., et al, "Transport Layer Security (TLS) / Datagram Transport Layer Security (DTLS) Profiles for the Internet of Things," Internet Engineering Task Force (IETF); ISSN 2070-1721; Jul. 2016; http://www.rfc-editor.org/info/rfc7925.
(Continued)

*Primary Examiner* — Michael A Keller
(74) *Attorney, Agent, or Firm* — Martensen IP

(57) ABSTRACT

Statically configured secure tunnels forward application-level Transmission Control Protocol ("TCP") application data between servers using a User Datagram Protocol ("UDP") channel. Applications operating on a server cluster can communicate with other applications on another server in the cluster over the public Internet using secure TCP connection forwarding through a single UDP datagram-oriented communication channel.

25 Claims, 12 Drawing Sheets

Related U.S. Application Data on Aug. 7, 2018, provisional application No. 62/716,562, filed on Aug. 9, 2018, provisional application No. 62/717,194, filed on Aug. 10, 2018, provisional application No. 62/723,373, filed on Aug. 27, 2018.

(51) Int. Cl.

| | | |
|---|---|---|
| *H04L 29/08* | (2006.01) | |
| *H04L 9/08* | (2006.01) | |
| *G06F 9/54* | (2006.01) | |
| *H04L 12/66* | (2006.01) | |

(52) U.S. Cl.
CPC ............ *H04L 12/66* (2013.01); *H04L 63/029* (2013.01); *H04L 63/166* (2013.01); *H04L 67/10* (2013.01); *H04L 67/141* (2013.01); *H04L 69/16* (2013.01); *H04L 69/162* (2013.01); *H04L 69/326* (2013.01)

(58) Field of Classification Search
CPC ..... H04L 69/16; H04L 63/166; H04L 69/326; H04L 69/162; H04L 45/306; H04L 63/0272; H04L 12/4604; H04L 12/4641; H04L 69/08; G06F 9/547
See application file for complete search history.

(56) References Cited

U.S. PATENT DOCUMENTS

| | | | |
|---|---|---|---|
| 9,037,709 B2 | 5/2015 | Enns | |
| 9,215,131 B2 | 12/2015 | Frey | |
| 9,342,293 B2 | 5/2016 | Enns | |
| 9,467,454 B2 | 10/2016 | Aravindakshan | |
| 9,577,909 B2 | 2/2017 | Li | |
| 9,577,927 B2 | 2/2017 | Hira | |
| 9,661,005 B2 | 5/2017 | Kamble | |
| 10,027,687 B2 | 7/2018 | Kamble | |
| 10,038,669 B2 * | 7/2018 | Kizu | ................... H04L 63/0209 |
| 10,679,039 B2 * | 6/2020 | Gallagher | .......... G06K 9/00255 |
| 2003/0088698 A1 | 5/2003 | Singh | |
| 2005/0163061 A1 | 7/2005 | Piercey | |
| 2006/0029016 A1 | 2/2006 | Peles | |
| 2006/0235939 A1 | 10/2006 | Yim | |
| 2008/0072307 A1 | 3/2008 | Maes | |
| 2008/0291928 A1 | 11/2008 | Tadimeti | |
| 2008/0301799 A1 * | 12/2008 | Arnold | ................ G06F 21/6218 |
| | | | 726/14 |
| 2009/0040926 A1 | 2/2009 | Li | |
| 2009/0138611 A1 | 5/2009 | Miao et al. | |
| 2010/0161960 A1 | 6/2010 | Sadasivan | |
| 2012/0166593 A1 | 6/2012 | Yoon et al. | |
| 2012/0226820 A1 | 9/2012 | Li | |
| 2013/0133043 A1 | 5/2013 | Barkie | |
| 2013/0283364 A1 | 10/2013 | Chang | |
| 2013/0298201 A1 | 11/2013 | Aravindakshan | |
| 2014/0200013 A1 | 7/2014 | Enns | |
| 2014/0207854 A1 | 7/2014 | Enns | |
| 2015/0026262 A1 | 1/2015 | Chaturvedi et al. | |
| 2015/0195293 A1 | 7/2015 | Kamble | |
| 2015/0229649 A1 | 8/2015 | Aravindakshan | |
| 2015/0381484 A1 | 12/2015 | Nira | |
| 2017/0134399 A1 | 5/2017 | Kamble | |
| 2017/0149548 A1 | 5/2017 | Nira | |
| 2017/0237708 A1 * | 8/2017 | Klaghofer | ........... H04L 65/1069 |
| | | | 726/12 |

OTHER PUBLICATIONS

PCT/US2019/045425; International Search Report and Written Opinion of the International Searching Authority; dated Oct. 24, 2019.
PCT/US2019/045431; International Search Report and the Written Opinion of the International Searching Authority; dated Oct. 28, 2019.
Reardon, Joel, et al.; "Improving Tor using a TCP-over-DTLS Tunnel"; May 25, 2009; http://www.cypherpunks.ca/~iang/pubs/TorTP.pdf (15 pages).
PCT/US2019/045430; International Search Report and Written Opinion of the International Searching Authority; dated Oct. 24, 2019.
PCT/US2019/048355; International Search Report and the Written Opinion of the International Searching Authority; dated Oct. 28, 2019.
Tan, J., et al.; "Optimiing Tunneled Grid Connectivity Across Firewalls"; CRPIT vol. 99, Grid Computing and e-Research 2009; Proc. 7th Australasian Symposium on Grid Computing and e-Research (AusGrid 2009), Wellington, New Zealand; pp. 21-28.

* cited by examiner

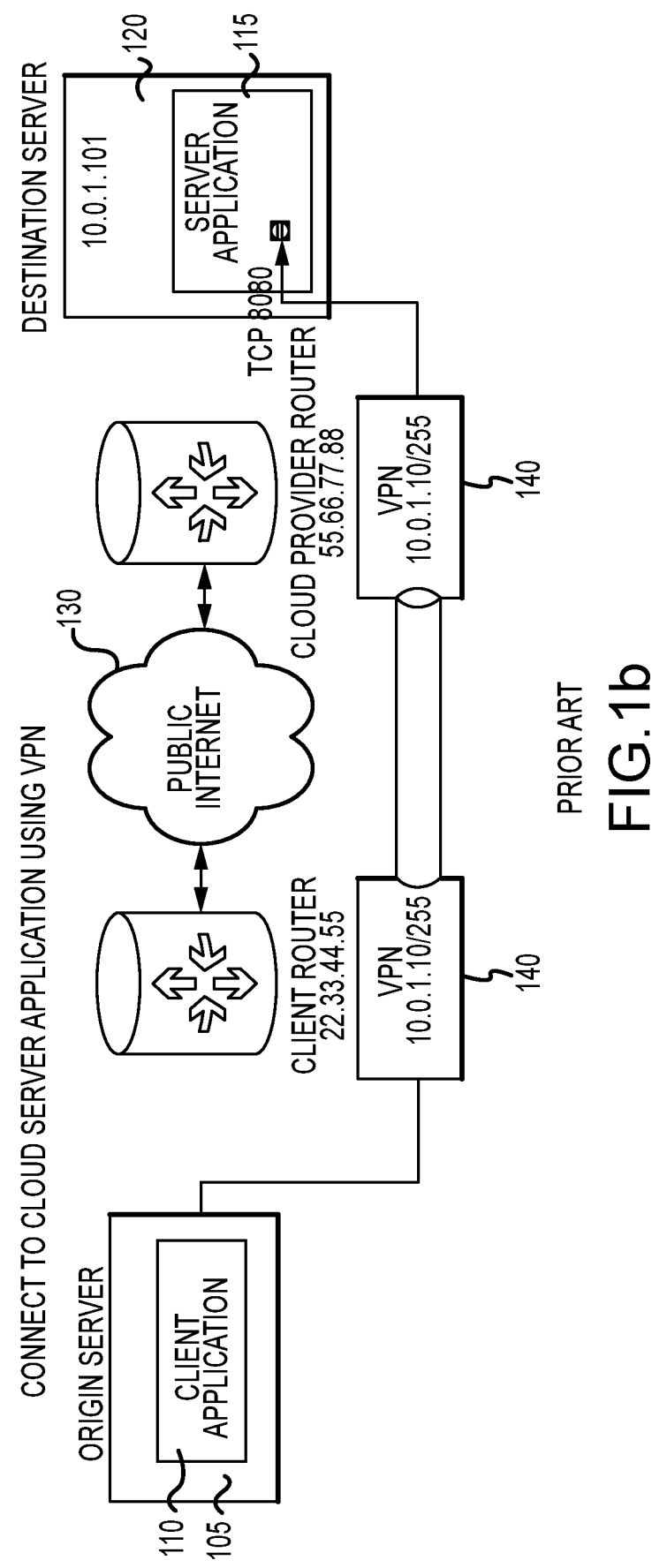

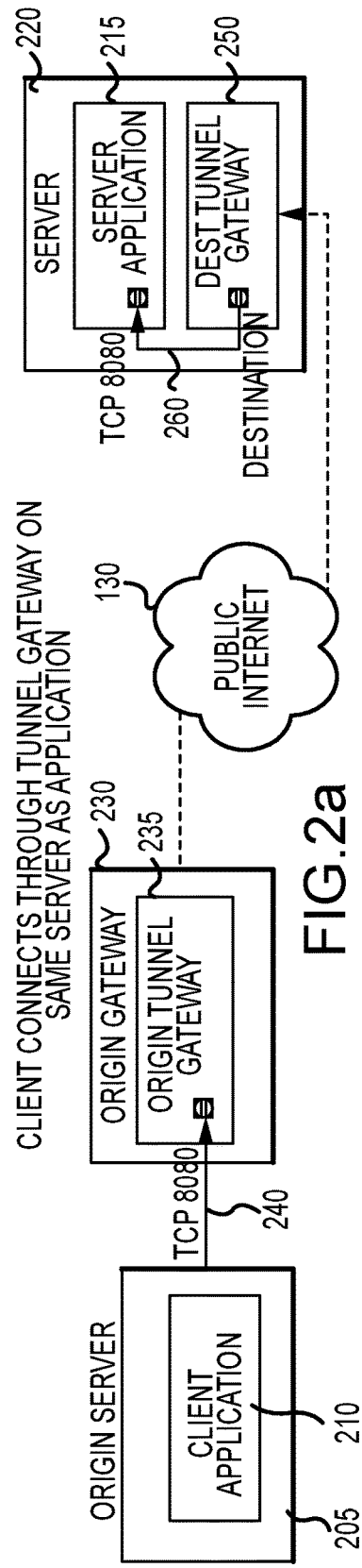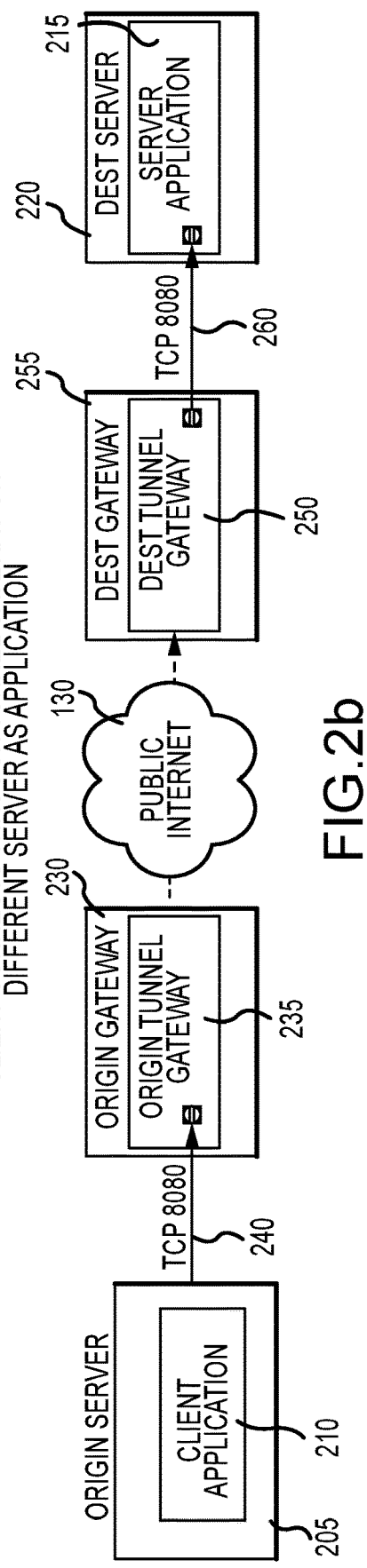

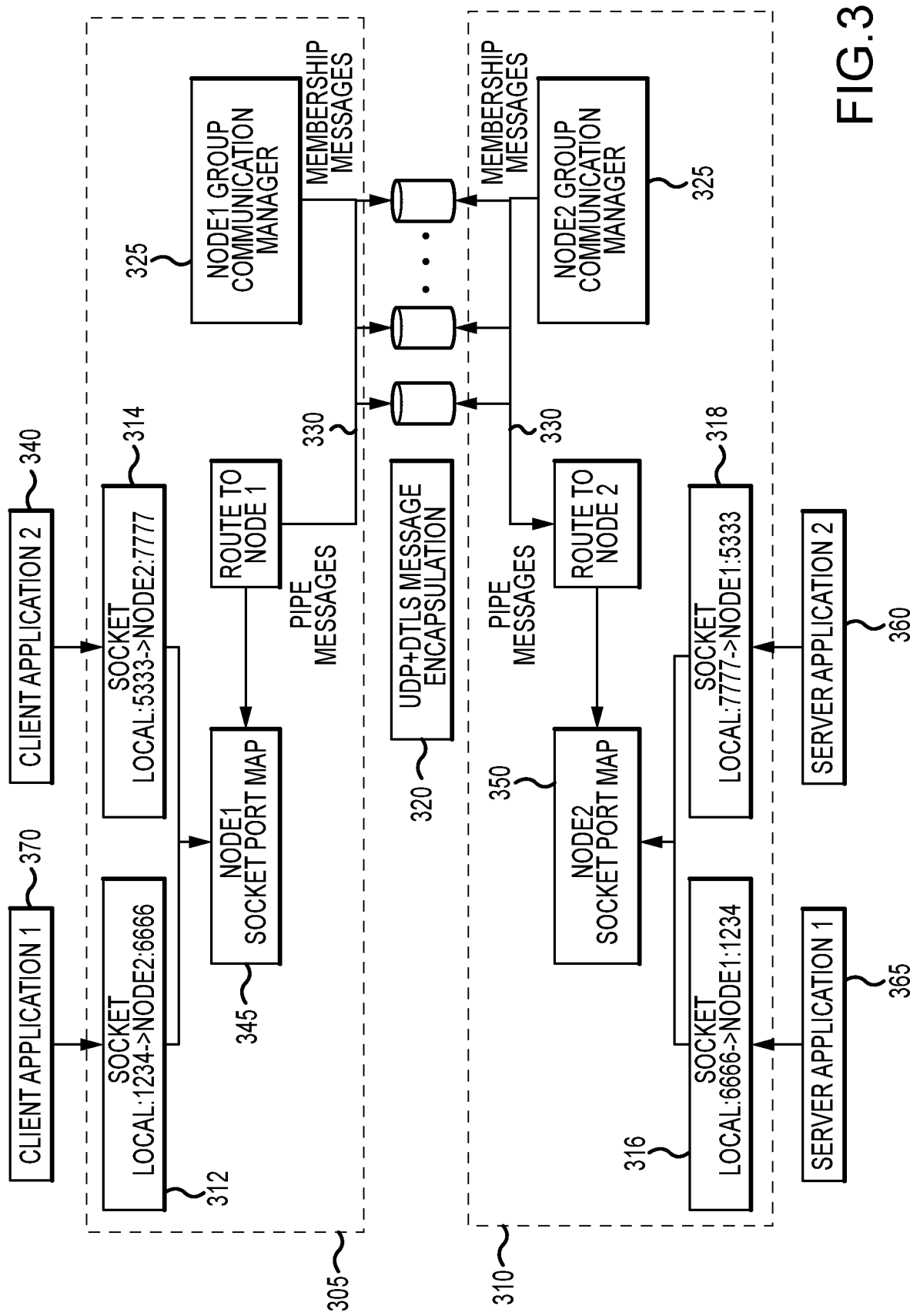

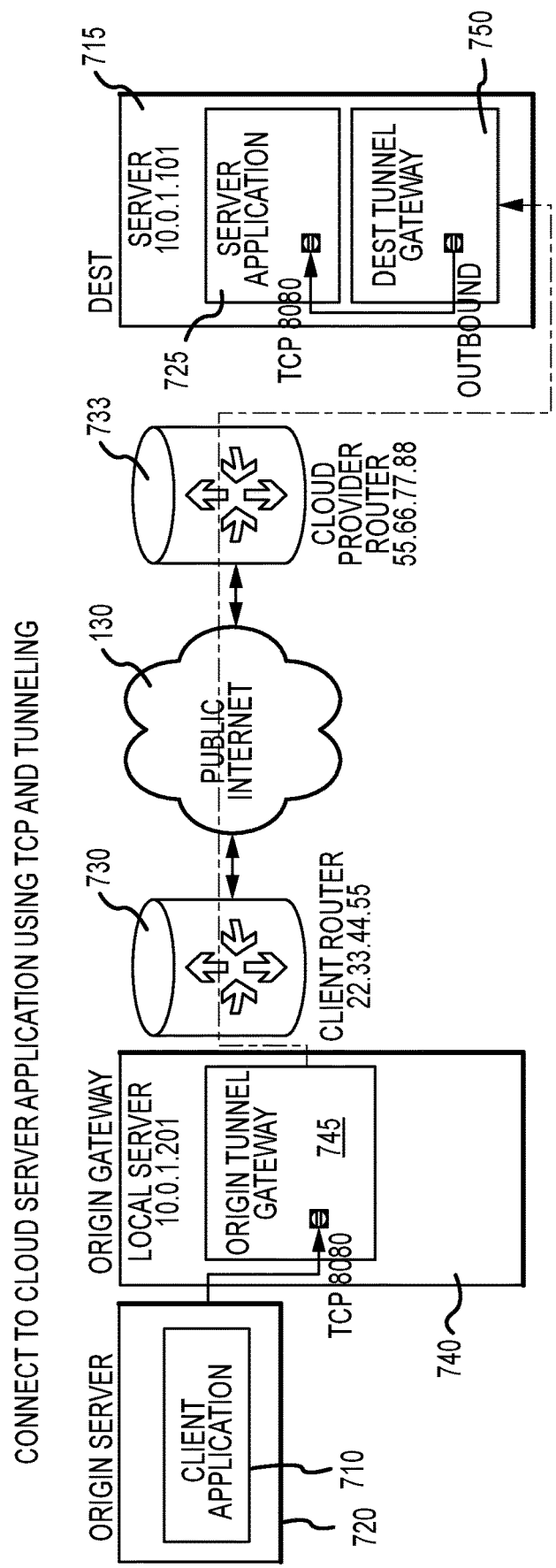

APPLICATION TRANSMISSION CONTROL PROTOCOL TUNNELING OVER THE PUBLIC INTERNET

RELATED APPLICATION

The present application relates to and claims the benefit of priority to U.S. Provisional Patent Application No. 62/715,361 filed 7 Aug. 2018, 62/715,367 filed 7 Aug. 2018, 62/716,562 filed 9 Aug. 2018, 62/717,194 filed 10 Aug. 2018, and 62/723,373 filed 27 Aug. 2018, all of which are hereby incorporated by reference in their entirety for all purposes as if fully set forth herein. The present application is related to commonly assigned U.S. patent application Ser. No. 16/532,677 entitled "SYSTEMS AND METHODS FOR SERVER CLUSTER NETWORK COMMUNICATION ACROSS THE PUBLIC INTERNET" filed 6 Aug. 2019.

BACKGROUND OF THE INVENTION

Field of the Invention

Embodiments of the present invention relate, in general, to Transmission Control Protocol ("TCP") connection forwarding and more particularly to forwarding application-level TCP connections between servers.

Relevant Background

A server cluster is a set of loosely or tightly connected computers that work together so that, in many respects, they can be viewed as a single system. The components of a cluster are usually connected to each other through Local Area Networks (LANs), with each node running its own instance of an operating system. Clusters are usually deployed to improve performance and availability over that of a single computer, while typically being much more cost-effective than single computers of comparable speed or availability. And since most clusters operate inside a LAN they can freely communication avoiding security concerns present with interaction of the public Internet. FIG. 1a depicts a typical connection between a client application, resident on an origin server 105, and a server application 115, resident on a destination server within the same LAN.

Traditional clustering software is intended to be deployed on a well-controlled LANs for two reasons. First and expressed above, vendors consider software on a LAN to be secure or at least more secure than to provide direct access to their software or services over the public Internet. Second, Individual layer-4 (TCP and UDP) communication channels required for traditional clustering software to function are diverse and are easier to manage inside a LAN. For example, below is the list of network ports used for Microsoft Windows Server Failover Clustering (WSFC)

| TCP/UDP | Port | Description |
| --- | --- | --- |
| TCP/UDP | 53 | User & Computer Authentication [DNS] |
| TCP/UDP | 88 | User & Computer Authentication [Kerberos] |
| UDP | 123 | Windows Time [NTP] |
| TCP | 135 | Cluster DCOM Traffic [RPC, EPM] |
| UDP | 137 | User & Computer Authentication [NetLogon, NetBIOS] |
| UDP | 138 | DSF, Group Policy [DFSN, NetLogon, NetBIOS Datagram Service] |
| TCP | 139 | DSF, Group Policy [DFSN, NetLogon, NetBIOS Datagram Service] |
| UDP | 161 | SNMP |
| TCP/UDP | 162 | SNMP Traps |
| TCP/UDP | 389 | User & Computer Authentication [LDAP] |
| TCP/UDP | 445 | User & Computer Authentication [SMB, SMB2, CIFS] |
| TCP/UDP | 464 | User & Computer Authentication [Kerberos Change/Set Password] |
| TCP | 636 | User & Computer Authentication [LDAP SSL] |
| TCP | 3268 | Microsoft Global Catalog |
| TCP | 3269 | Microsoft Global Catalog [SSL] |
| TCP/UDP | 3343 | Cluster Network Communication |
| TCP | 5985 | WinRM 2.0 [Remote PowerShell] |
| TCP | 5986 | WinRM 2.0 HTTPS [Remote PowerShell SECURE] |
| TCP/UDP | 49152-65535 | Dynamic TCP/UDP [Defined Company/Policy {CAN BE CHANGED}] |

These diverse criteria necessitate dedicated interconnecting channels to enable server cluster operations. To span clusters across multiple LANs via the public Internet 130 vendors predominately use of dedicated Virtual Private Networks 140 or VPNs as depicted in FIGS. 1b and 1c, for both security, and to provide an unrestricted layer-3 network path between servers to support the diverse set of required layer-4 communication channels.

A VPN is a secure tunnel through which communication and data can flow between two points securely. Recall that the Internet is a packet-switched network meaning there is no single, unbroken connection between sender and receiver. Instead, when information is sent, it is broken into small packets and sent over many different routes to the same location at the same time, and then reassembled at the receiving end. This is opposed to circuit-switch network such as the telephone system which, after a call is made and the circuits are switched, carve out part of the network for a single direct connection.

Every packet transmitted on the Internet carries information to direct the packet to its location and how it is to be used. For example, some packets may be used to form a website using Hypertext Transfer Protocol, (HTTP) while others may use Internet Message Access Protocol (IMAP) for accessing email. Certainly, each packet needs to know to what address it is being sent and who is the sender. The Transmission Control Protocol (TCP) and the Internet Protocol (IP) are the most common set of protocols for breaking down and reassembling packets.

The TCP/IP model is broken into four layers that address the problem of breaking up data into packets, sending them across the Internet and reassembling them at their destination. These layers include the application, transport, internet, and network access layers. The network access layer is responsible for converting binary data to network signals. This includes the network card on a computer or modem that converts computer friendly data to network friendly signals. The internet layer provides logical addressing, path determination and forwarding.

The application layer comprises various protocols that govern the interaction with an application, data translation, encoding, dialogue control can communication coordination between systems. There are numerous application protocols with some of the more common being HTTP, IMAP, File Transfer Protocol (FTP), Simple Mail Transfer Protocol (SMTP), Domain Name Service (DNS) and the like.

The transport layer is concerned with end-to-end transportation of data and sets up a logical connection between hosts. Two protocols available in this layer are TCP and User Datagram Protocol (UDP). While TCP is a connection orientated and reliable using windowing to control the ordered flow and delivery of data segments, UDP simply transfers data without the bells and whistles providing faster delivery of data albeit less reliable.

In a VPN each packet of a message is encrypted and then encapsulated inside a normal TCP IP packet for transportation. These normal IP packets include a destination address at the other end of the tunnel at which the encapsulated packets are delivered. So as the packets move through the internet the true address of the encapsulated packets cannot be read, only the tunnel address is accessible.

At the receiving end the computer or router strips off the exterior IP packet and decrypts the interior packet. Based on that information the interior packet is delivered to the destination. This process requires 4 layers of communication channels to affect the secure delivery of data and these layers come at a cost. At its core, a VPN protocol is basically a mix of transmission protocols and encryption standards.

In a system using a traditional software Virtual Private Network as shown in FIG. 1c, the client host 150 and server hosts 155 can address one another directly through a layer-2 or layer-3 network link. A software VPN establishes itself as a route for network traffic in the host networking stack, typically using a specialized network device driver, and behaves as a point-to-point network link.

Turning back to the depiction shown in FIGS. 1b and 1c, with a VPN communication link established, each side (the origin server 105 and the destination server 120) has its own IP address, and possibly link-level address if the VPN is layer-2. On the Linux platform, for example, VPNs will typically use one of the PPP, L2TP, or TUN/TAP kernel device drivers.

A software VPN as shown in FIG. 1c typically has a software application 162 component that attaches itself to the device driver 160, establishes a layer-4 communication channel to the client 110 or server application 115, and encapsulates and exchanges the layer-2/layer-3 traffic with the remote side of the host. Most VPN applications encapsulate the layer-2/layer-3 traffic using TCP, User Datagram Protocol ("UDP"), or Generic Routing Encapsulation ("GRE") as the transport protocol. The network route established by the VPN then allows the client application 110 to connect directly to the server application 115 using the address of the host that the server application is running on. Depending on how network addressing is configured with the VPN, the IP address used to connect to the host may be different from that host's LAN address or public Internet address.

Once a VPN channel is established not only can the client application 110 resident on the origin server 105 interact securely with the server application 115 resident on the destination server 120 but any other resource linked to the host stack is accessible through the VPN. An established VPN opens and unlocks all resources within the connected servers. Consider as an analogy a home (destination server) in which a guest (the client application) knocks on the door to visit a friend in a specific room (server application). Once the door is opened (the VPN established the guest has access to the friend), the guest has free access to the remainder of the home and can interact with anyone else that may be present in the home. Lacking other security measures, the client application 110 can see and access host data 170 resident on the destination server 120, and any other application running on the destination server 120 can interact with the client application 110 and data associated with the origin server 105. The VPN therefore opens multiple communication channels between the two servers. This open access necessitates implementation of additional and cost security protocols to prevent inadvertent disclosure or malicious attempts to retrieve unauthorized information.

While VPNs are versatile in limited applications, a need exists to reduce the number of layer-4 communication channels to one per pair of servers. There is a need to establish a secure communication tunnel between a client application and server application using the TCP protocol over an untrusted public Internet by forwarding application-level TCP connections between servers. Such an improvement would enable direct application-to-application communication over the public Internet, without the use of a VPN or dedicated private network, and support traversal of NAT routers without any special configuration. Such direct server-to-server communication is critical to foster distributed (public Internet) server cluster architectures. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A system and corresponding methodology for secure communications between applications over the public Internet includes instituting a origin direct layer-4 Terminal Control Protocol (TCP) network route between a client application residing on an origin server and an origin tunnel gateway application residing on an origin gateway. In doing so client application data is transmitted to the origin tunnel gateway application using a TCP transport suitable format.

A single private and secure single User Datagram Protocol (UDP) datagram-orientated communication channel is thereafter established between the origin tunnel gateway application residing on the origin gateway and a destination tunnel gateway application residing on a destination gateway. Client application data is packaged, at the origin tunnel gateway application, into a UDP transport suitable format and forwarded, using the private and secure single UDP datagram-orientated communication channel, from the origin tunnel gateway application to the destination tunnel gateway application using UDP.

Upon arrival at the destination tunnel gateway application, client application data is repackaged into the TCP transport suitable format. A destination direct layer-4 network TCP route is instituted between the destination tunnel gateway application residing on the destination gateway and a server application residing on a destination server whereby client application data, now repackaged back to a TCP format is transmitted to the server application using TCP.

Another feature of the present invention is that the origin tunnel gateway application includes one or more listening TCP sockets configured to accept application connections. Each connection accepted by the origin tunnel gateway application constitutes a separate communication session resulting in a separate TCP connection between a specific origin tunnel gateway application and a specific client application. Responsive to a new connection begin accepted by a listening TCP socket, a pipe router and a connection state machine, both residing on the origin tunnel gateway application, signal to the destination tunnel gateway application to initiate the new outbound TCP connection to the server application. To ensure security, the pipe router and the connection state machine encapsulate messages using Datagram Transport Layer Security (DTLS) protocols.

Once the new outbound TCP connection to the server application is connected, client application data can be transferred between the client application on the origin server with the server application on the destination server via the private and secure single UDP datagram-orientated communication channel.

Another feature of the present invention is that client application access is limited to the server application and server application access is limited to the client application. Despite this narrow channel of communication, the origin tunnel gateway application and the destination tunnel gateway application can manage one or more tunnel connections between the client application and the server application.

The method and features described above can be stored as machine executable code on a non-transitory machine-readable storage medium as instructions that, when executed by at least one machine, causes the machine to institute a origin direct layer-4 Terminal Control Protocol (TCP) network route between a client application residing on an origin server and an origin tunnel gateway application residing on an origin gateway whereby client application data is transmitted to the origin tunnel gateway application using a TCP transport suitable format. The code can further establish a private and secure single User Datagram Protocol (UDP) datagram-orientated communication channel between the origin tunnel gateway application residing on the origin gateway and a destination tunnel gateway application residing on a destination gateway.

Additional instructions package, at the origin tunnel gateway application, client application data into a UDP transport suitable format and cause the machine to forward, using the private and secure single UDP datagram-orientated communication channel, client application data from the origin tunnel gateway application to the destination tunnel gateway application using UDP.

The machine executing the code can thereafter repackage, at the destination tunnel gateway application, client application data into the TCP transport suitable format for transmission to a server application using a destination direct layer-4 network TCP route initiated between the destination tunnel gateway application residing on the destination gateway and a server application residing on a destination server.

The computer system for transmission control protocol tunneling according to the present invention includes a machine capable of executing instructions embodied as software, and a plurality of software portions configure to carry out the steps described above.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIG. 1a and FIG. 1b are high level network connection diagrams illustrating typical configurations for connecting a client application to a server application as would be known to one of reasonable skill in the relevant art;

FIGS. 2a and 2b depict two alternative network communication configurations for terminal control protocol tunneling over the public Internet according to one or more embodiment of the present invention;

FIG. 3 is a logical depiction of a terminal control protocol tunneling using a secure UDP channel between a plurality of nodes on distribute computing resources, according to one embodiment of the present invention;

FIGS. 7a and 7b are high level network communication configurations for terminal control protocol tunneling and forwarding of client application data via a secure UDP channel, according to one embodiment of the present invention.

Figure 1C:
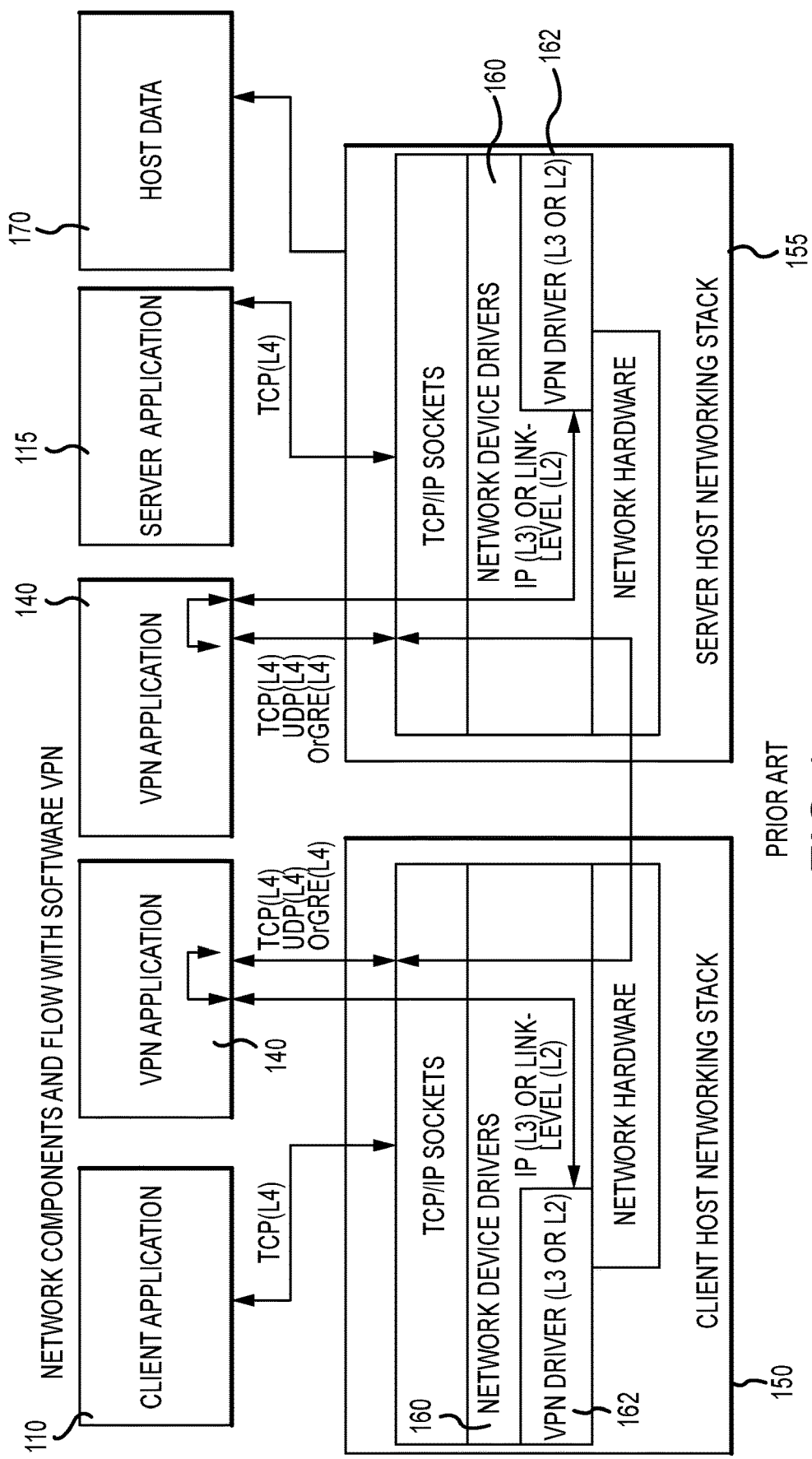
FIG. 1c is a logical depiction of a Virtual Private Network connection between a client application and a server application as would be known to one of reasonable skill in the relevant art.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

A system and corresponding method for statically configuring secure tunnels is hereafter described by way of example. The present invention forwards application-level Transmission Control Protocol application data between servers using a User Datagram Protocol channel. According to one embodiment of the present invention, servers that are part of a server cluster, communicate with one another over the public Internet using secure TCP connection forwarding through a single UDP datagram-oriented communication channel.

TCP connection tunneling of the present invention allows a client application resident on an origin server to connect to a destination server application resident on a destination server in situations where it may not have a secure network route such as through a VPN connection. In this scenario and according to one embodiment of the present invention and with reference to FIGS. 2a and 2b, an origin gateway server 230, running an origin tunnel gateway application 235, establishes a direct layer-4 network TCP route 240 between the origin gateway server 230 and a client application 210 resident on an origin server 205. The origin tunnel gateway application 235 has a counterpart destination tunnel gateway application 250 resident, in one embodiment, on a destination gateway 255, with which it has an established a message channel. The destination tunnel gateway application 250 initiates a direct layer-4 network TCP route 260 to the destination server 220 on which the server application 215 is running. In an alternative embodiment, as shown in FIG. 2*a*, the destination tunnel gateway application 250 may be running on the destination server 220 itself.

Client application data, arriving at the origin tunnel gateway application in a TCP communication format, is repackaged to conform with UDP communication criterion. Once reformatted or packaged, the client application data is transmitted over the public Internet using a single, private and secure UDP datagram-oriented communication channel.

In this version of the present invention, the origin tunnel gateway includes listening TCP sockets configured to accept new connections. When a new connection is accepted, the origin tunnel gateway application signals the destination tunnel gateway application to initiate a new outbound TCP connection to the predetermined server application on the destination server. Once successfully connected, all TCP data received from the origin socket is converted to a UDP format and forwarded to the destination socket through a UDP channel and thereafter restored to its original TCP format before delivery to the server application.

The present invention provides a secure, private TCP communication between disconnected/geographical networks over untrusted networks, such as the public Internet using a UDP datagram-oriented communication channel. It provides functionality similar to a VPN, however has greater security advantages and is less complex. The present invention can further be integrated with an application management platform, to provide automatic connectivity of distributed applications across the public Internet. This can support simplified configuration of high-availability, replication, and disaster recovery features associated with server clusters, without the need for a VPN, or any reconfiguration of the host networking stack.

As one of reasonable skill in the relevant art will appreciate, one implementation of the present invention is as part of a high-availability application clustering software system. A high-availability clustering system manages applications that can run on any one server of the server cluster and move the application between servers in response to failures. In such an instance the present invention is configured to automatically establish tunnel origins on inactive servers to support application access to such servers from any server, regardless of which server on which the application is active.

Embodiments of the present invention are herein described in detail with reference to the accompanying Figures. Although the invention is described and illustrated with a certain degree of particularity, it is understood that the present disclosure has been made only by way of example and that numerous changes in the combination and arrangement of parts can be resorted to by those skilled in the art without departing from the spirit and scope of the invention.

This description of the present invention, with reference to the accompanying drawings, is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

For the purpose of the present invention the following acronyms and terms are assumed to represent and should be interpreted as:

IP—internet protocol. Occupies layer-3 in the OSI model. The Internet Protocol is responsible for ensuring packets are sent to the correct destination.

IPv4—Internet protocol version 4, with a 32-bit address space

ISP—Internet Service Provider

OSI Model—Open Systems Interconnection model, a standard characterization of functional layers of networking using seven layers as opposed to the four layers of the TCP model.

Tunnel or Tunneling Protocol (also referred to herein as a channel)—In computer networks, a tunneling protocol is a communications protocol that allows for the movement of data from one network to another. It involves allowing private network communications to be sent across a public network (such as the Internet) through a process called encapsulation. Because tunneling involves repackaging the traffic data into a different form, perhaps with encryption as standard, it can hide the nature of the traffic that is run through a tunnel. The tunneling protocol works by using the data portion of a packet (the payload) to carry the packets that actually provide the service. Tunneling uses a layered protocol model such as those of the OSI or TCP/IP protocol suite, but usually violates the layering when using the payload to carry a service not normally provided by the network. Typically, the delivery protocol operates at an equal or higher level in the layered model than the payload protocol.

Port—A Port is opening on a machine through which data can flow.

Port Forwarding—A technique provided by most NAT routers to allow connections from the public Internet to an internal server NAT—Network Address Translation, a technology used prolifically to connect local area networks to the public Internet. NAT enables a plurality of servers (computers) to interact with the public internet via a single external IPv4 address.

TCP—Transmission Control Protocol, a stream-oriented, reliable-delivery data transfer protocol. The Transmission Control Protocol provides a communication service at an intermediate level between an application program and the Internet Protocol. It provides host-to-host connectivity at the transport layer of the Internet model. An application does not need to know the particular mechanisms for sending data via a link to another host, such as the required IP fragmentation to accommodate the maximum transmission unit of the transmission medium. At the transport layer, (layer 4 in the OSI model) TCP handles all handshaking and transmission details and presents an abstraction of the network connection to the application typically through a network socket interface.

UDP—User Datagram Protocol, a not-necessarily-in-order datagram delivery protocol, used over IP. UDP uses a simple connectionless communication model with a minimum of protocol mechanisms. UDP provides checksums for data integrity, and port numbers for addressing different functions at the source and destination of the datagram. UDP does not use any handshaking dialogues, and thus exposes the user's program to any unreliability of the underlying network. Occupies layer-4 in the OSI model.

GRE—Generic Routing Encapsulation, a simplified datagram-oriented protocol used by certain VPNs to exchange layer-2 or layer-3 traffic. GRE itself may be considered layer-4 in the OSI model, as it sits above layer-3 protocols, but is considered to break the layering order by containing messages from lower layers.

Host Networking Stack—The primary network state machine running on a server or any other networked computer and is typically, part of the operating system kernel. The Host Networking Stack provides layer-4 socket services for TCP and UDP protocols, as well as state machines for layer-3 protocols such as IPv4/IPv6, layer-2 protocols, network hardware drivers, and virtual network drivers for VPNs.

LAN—Local Area Network.

WAN—Wide Area Network. A network that typically connects distant sites to one another or to the public Internet. The public Internet is considered a WAN.

VPN—Virtual Private Network. A layer-2 or layer-3 networking technology that allows local networks to be securely extended or bridged over WANs, such as the public Internet.

Transport Layer Security. A method for establishing private, authenticated communication channels over stream-oriented communication channels such as TCP.

WSFC—Microsoft Windows Server Failover Clustering; software that allows servers working together as a computer cluster.

DTLS—Datagram Transport Layer Security. A method for establishing private, authenticated communication channels over non-reliable, out-of-order datagram communication channels such as UDP.

Socket—A network Socket is an endpoint instance, defined by a hostname or IP address and a port, for sending or receiving data within a node on a computer network. A socket is a representation of an endpoint in networking software or protocol stack and is logically analogous to physical female connections between two nodes through a channel wherein the channel is visualized as a cable having two mail connectors plugging into sockets at each node. For two machines on a network to communicate with each other, they must know each other's endpoint instance (hostname/IP address) to exchange data Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

With reference to FIG. 3 and according to one embodiment of the present invention, a pair of tunnel gateways 305, 310 manages any number of individually tunneled connections. FIG. 3 is a logical depiction of communication traffic between two nodes in a server cluster. A characteristic of the origin tunnel gateway 305, according to the present invention, is to have a plurality of listening TCP sockets 312, 314 accept connections. Each connection accepted on the listening socket constitutes a separate communication session that results in a separate outbound TCP connection initiated by the destination tunnel gateway 310.

The logical connection in FIG. 3 is between Node1 and Node2 through a UDP DTLS channel 320. Messages sent over a UDP DTLS channel comes in at least two forms, serving different purposes. These include:

Group Communication Protocol messages ("Membership messages.") These messages managed by a group communication manager 325, are used to determine the responsiveness of other members of the server cluster, to reach a group consensus over which servers are currently available, and which server is the cluster coordinator. These messages do not need to be reliably delivered, or delivered in any specific order, but must be delivered as soon as possible, in order to quickly react to loss of communication.

Pipe messages. Pipe messages 330 provide reliable-delivery, stream-oriented channels, similar to Terminal Control Protocol (TCP) messages. Pipe messages operate in socket session contexts, and are multiplexed and routed using port numbers similar to TCP. Data on pipe sockets are delivered reliably and in order, and bear traffic for all higher-level cluster management functions. Pipe messages require a complex state machine to generate and process.

Using a pre-shared key Node1 and Node2 establish a secure channel by which pipe messages can be exchanged. For example socket instance 5333 of Node1 314 linked to client application 2 340 is tunneled through Node1's socket port map 345 to the Node2's socket port map 3501 to Node2's socket instance 7777 318 linked to server application 2 360. Similarly, an instantiation of server application 1 365 linked to socket instance 6666 316 at Node1 is tunneled through Node2's socket port map 350 to Node1's socket port map 345 to arrive at Node1's socket instance 1234 312 linked to client application 1 370. As each node may have multiple instances and each LAN may have a multiplicity of nodes, a communication manager 325 for both Node2 and Node2 manages the pipes 330 and their membership with the peer group.

Figure 4A:
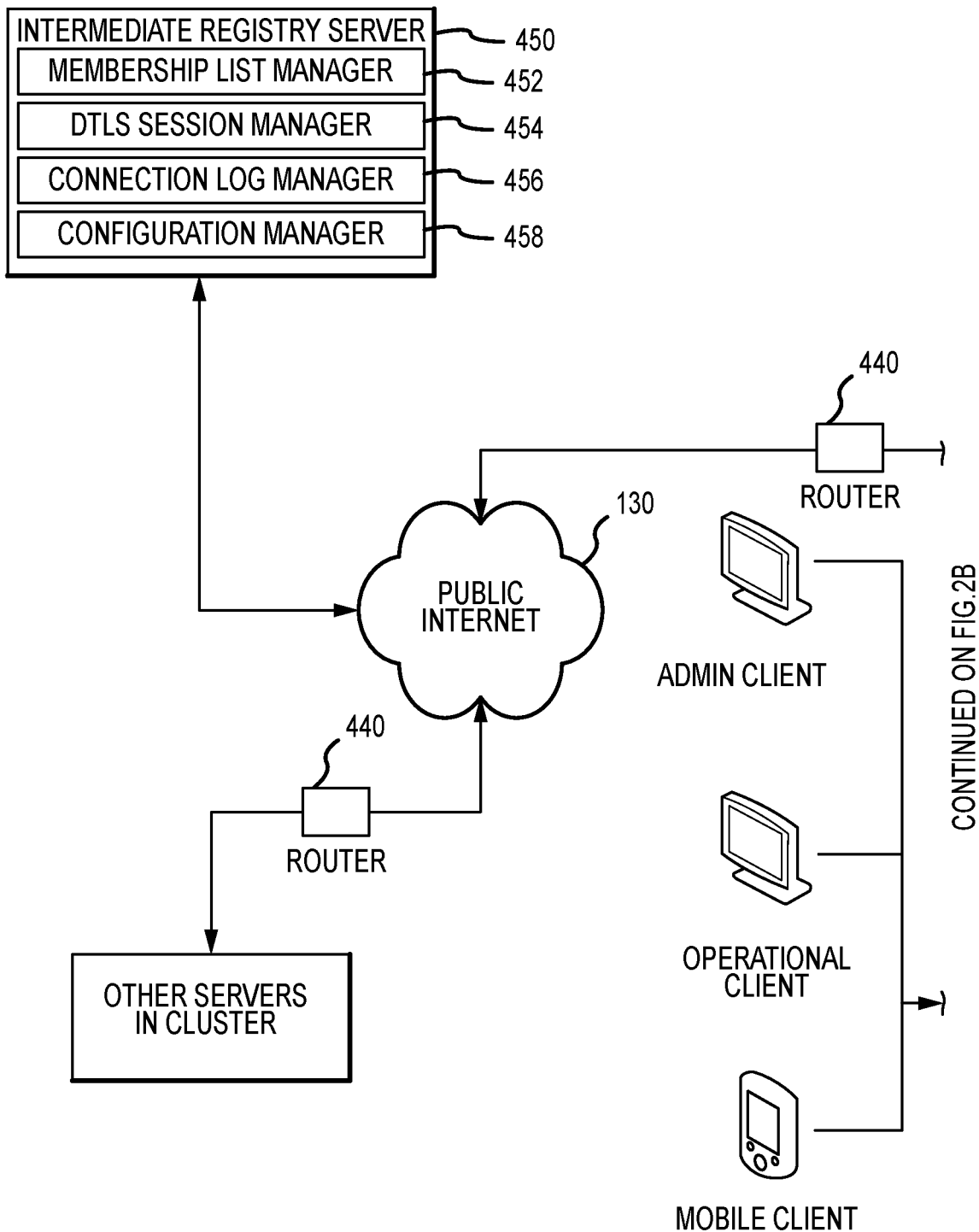
FIGS. 4a-4d is a system architecture drawing of a distributed server cluster showing various components, engines and modules used to provide terminal control protocol tunneling and forwarding of client application data via a secure UDP channel, according to one embodiment of the present invention.
Figure 4B:
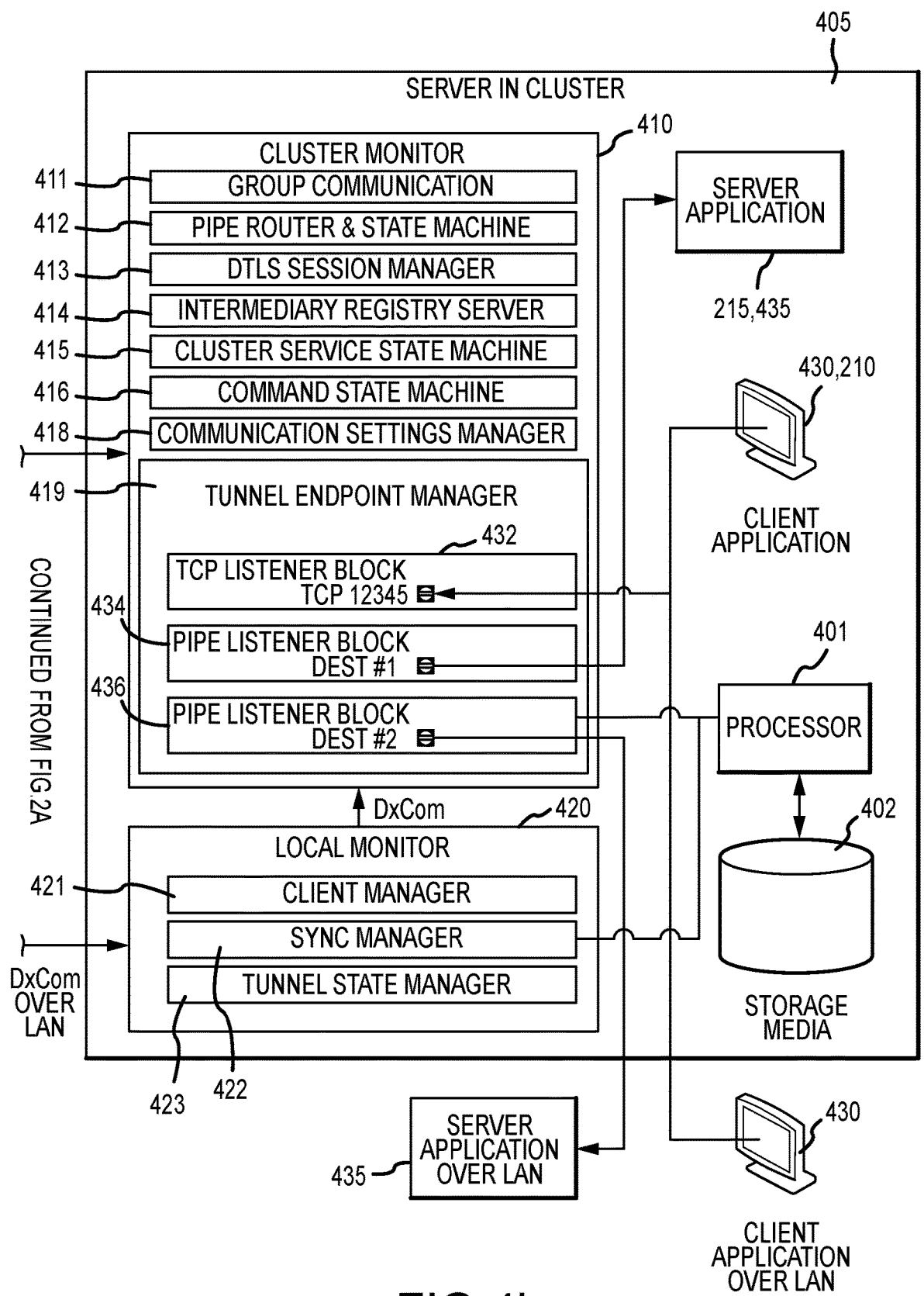

Referring now to FIGS. 4a and 4b, one embodiment of the present invention includes one or more servers 405 communicatively coupled to a public Internet 130 wherein each server includes, among other things, a cluster monitor 410, a local monitor 420, a processor 401, and a non-transitory storage media 402. Operating on one or more of the servers 405, or interacting with a server via a LAN, is a client application 430 and/or a server application 435. The invention supports the operation of TCP tunnels for use by these applications across a public Internet. TCP tunnels allow applications as illustrated and described herein to connect to one another through incongruent networks, such as across NAT routers 440, without opening access to the public Internet 130. Further, communicatively coupled to the Internet is an Intermediary Registry Server 450 enable cluster formation across a public Internet.

The Cluster Monitor 410 shown in FIG. 4 is responsible for establishing communication between all available servers participating in the tunnel gateway network, monitoring server availability, providing virtual synchrony through its coordinator, monitoring and synchronizing the state of attached service processes (Cluster Services), relaying commands between Cluster Service members, and maintaining tunnel endpoints. The Cluster Monitor, as part of forming a group of tunnel gateway servers, elects one specific member of that group to serve as the cluster coordinator. As the invention makes it possible and valuable to build networks of more than two tunnel gateway servers, the group of tunnel gateway servers is referred to herein as a cluster with the primary networking component being the Cluster Monitor.

From the point of view of the Cluster Monitor 410, a Cluster Service is an external software component participating in a named group. The Cluster Monitor informs all Cluster Services participating in the same group of each other's presence, and any changes that may occur to that group. The Local Monitor component functions as a Cluster Service. Any server in the group can serve in this role. Components of the Cluster Monitor include:

Group Communication module 411—Responsible for establishing communication with all available servers involved in the cluster, monitoring server availability and communication channels, and electing a server as the cluster coordinator.

Pipe Router and State Machine 412—Provides reliable, in-order stream-oriented messaging channels, over the unreliable, out-of-order, datagram-oriented UDP communication channel. Manages pipe sockets, both listening sockets and outgoing connections. The communication channels provided by this module are used by the Tunnel Endpoint Manager to establish new tunnel sessions and to exchange data on existing sessions. The Pipe Router and State Machine is also used internally by other Cluster Monitor components to communicate with other servers. The pipe state machine is similar to the TCP module found in most host networking stacks, and performs largely the same function, however in the current invention it acts as a private TCP-like software component within the Cluster Monitor component.

DTLS session manager 413—Responsible for establishing authenticated DTLS sessions with other servers in the cluster over UDP Intermediary Registry Server client 414—This client manages communication with the Intermediary Registry server, including NAT configuration discovery, group registrations, and invitations Cluster Service State Machine 415—Responsible for monitoring availability of Cluster Services, processing changes to the set of available Cluster Services, and informing active Cluster Service components running on each system of the current service membership.

Command State Machine 416—Monitors the state of relay commands submitted by various Cluster Services. This module also ensures consistent ordering of relayed commands, and the reliability of responses are sent back to the issuers of those commands.

Communication Settings Manager 418—The Communication Setting Manager maintains administratively configured details of the cluster, including the list of systems, their network addresses, and cryptographic secrets. Managing the process of adding and removing systems in an active cluster.

Figure 4C:
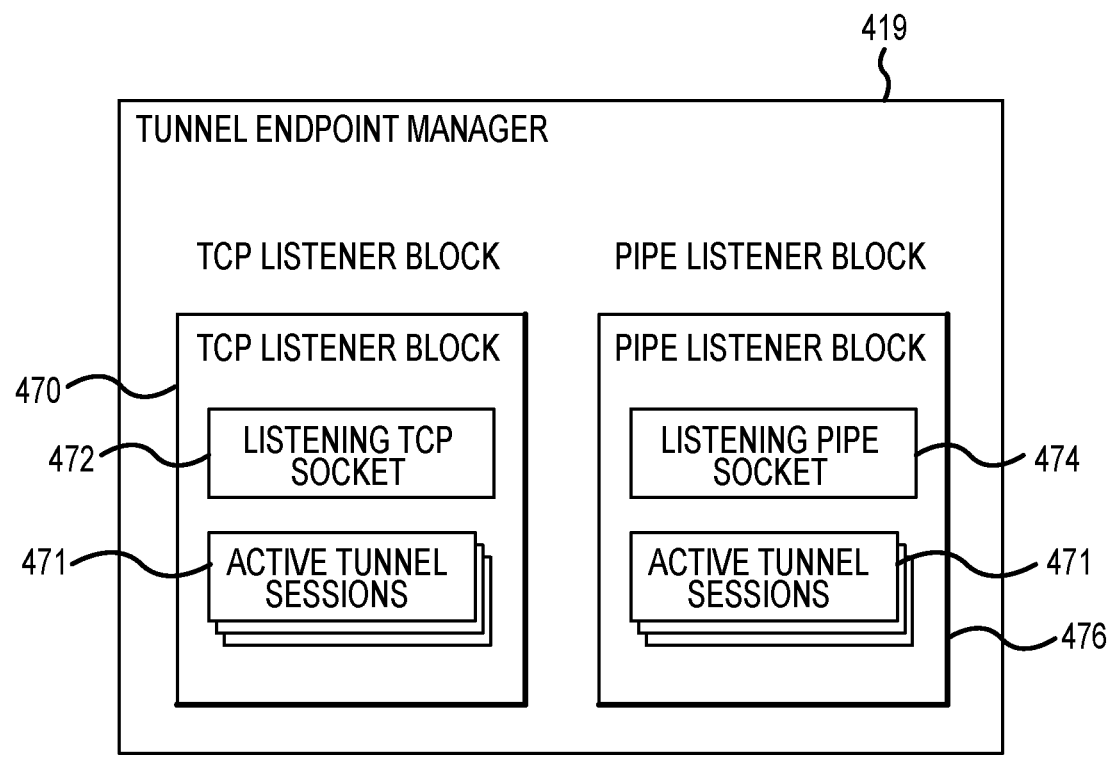
Figure 4D:
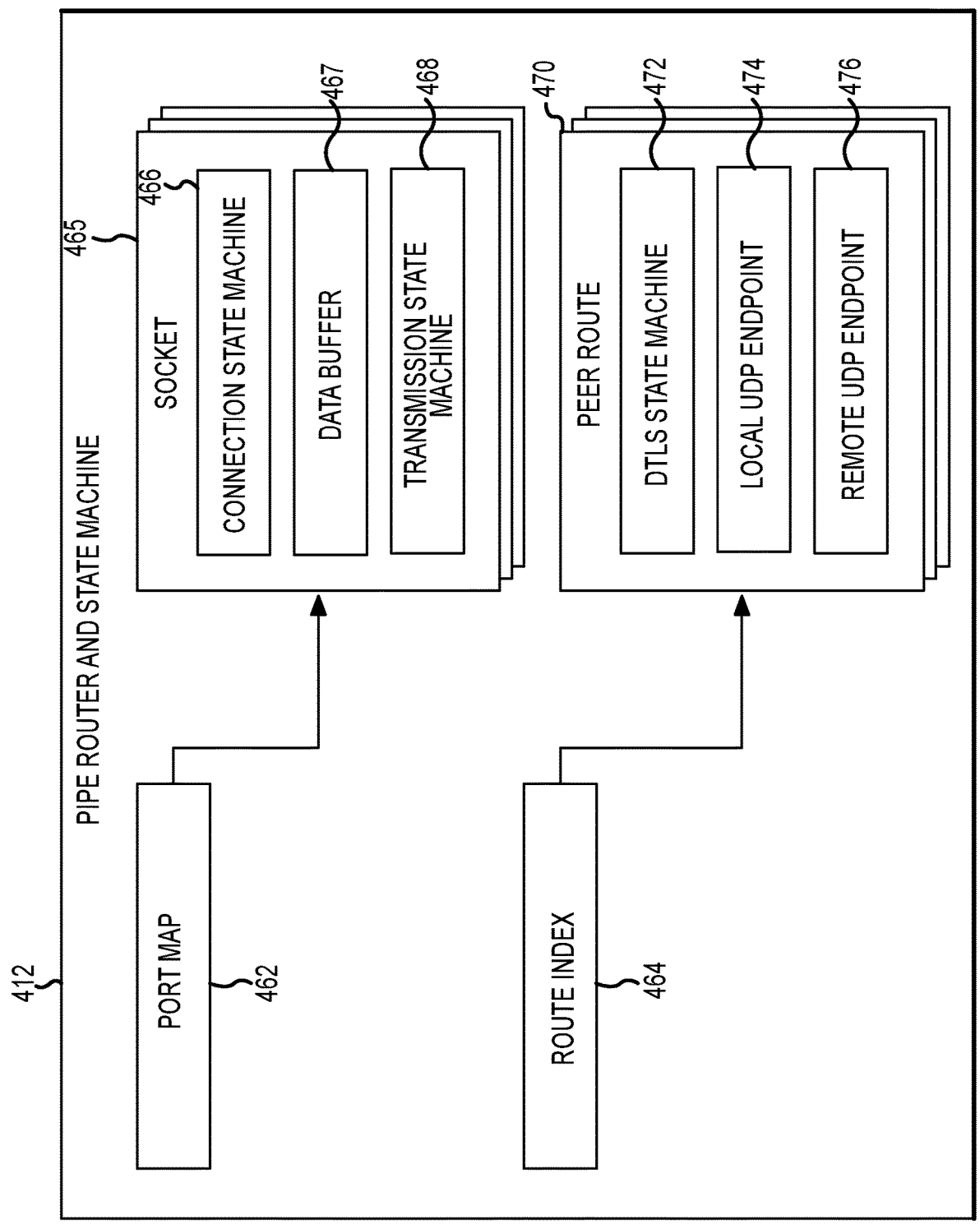

Tunnel Endpoint Manager 419—This component (shown with additional detail in FIG. 4c is responsible for creating, altering, or removing tunnel redirector endpoints based on global configuration. The Tunnel Endpoint Manager ensures that the tunnel configuration is synchronized between servers, processes updates to the global tunnel configuration, and manages two different types of tunnel endpoints:

TCP Listener Block 432—Listens on a TCP socket. For each newly accepted connection, the TCP Listener Block will initiate a pipe connection to a preconfigured address. Upon successful connection, all data received from the accepted TCP socket will be forwarded to the pipe socket, and vice versa.

Pipe Listener Block 434, 436—Listens on a pipe socket. For each newly accepted connection, the pipe listener block will initiate a TCP connection to a preconfigured address. Upon successful connection, all data received from the accepted pipe socket will be forwarded to the TCP socket, and vice versa.

Internally, the Pipe Router and State Machine 412 as part of the Cluster Monitor 410 (FIG. 4*d*) includes:

Socket port map 462—This map indexes all pipe router sockets by the local port they are bound to, as well as the remote port, if they are connected. Allows inbound messages to be quickly routed to the appropriate socket for processing.

Route index 464—The Route index contains a DTLS state machine and UDP communication channel details for each available peer, indexed by the peer's name. Each route provides a method of sending datagrams to a specific peer.

Each socket 465 managed by the Pipe Router and State Machine 412 includes:

Connection state machine 466—This machine identifies the state of the connection of a particular socket and determines interpretation of newly-received messages. The socket states precisely follow those outlined for TCP by RFC 793, including:

SynSent—Connection request sent to other side, pending response;

SynReceived—Connection request received, response not yet acknowledged;

Established—Connection request acknowledged by both sides, neither side has requested the connection be closed;

FinWait1—Local side has requested connection closure, remote side has not requested closure, nor has acknowledged local closure request;

FinWait2—Local side has requested connection closure, remote side has not requested closure, but has acknowledged local closure;

Closing—Local side has requested connection closure, remote side has requested connection closure also, but has not yet acknowledged local closure;

TimeWait—Both sides have requested connection closure, remote side has acknowledged, but may require retransmission of local acknowledgment;

CloseWait—Remote side has requested connection closure; local side has sent acknowledgment but has not requested closure;

LastAck—Remote side has requested connection closure, local side has sent acknowledgment and then requested closure, but has not yet been acknowledged; and Listening—Socket is open to accept new connection requests.

Data buffer 467—The data buffer contains outbound data that has not yet been acknowledged by the other side, and inbound data that is received out-of-order.

Transmission state machine 468—The transmission state machine decides when and how to send locally-originating data to the remote side. Performs: measurement of network capacity and round-trip-time, message loss analysis, transmission throttling, timed retransmission, and connection timeout actions The Local Monitor 420 resident on each server within the cluster maintains configuration state for tunnels, and provides an administrative interface. Components of the local monitor include:

Client Manager 421—This module is responsible for handling incoming client requests from local clients 403, passing the requests to the Application Coordinator, and maintaining client connections.

Sync Manager 422—The Sync Manager maintains administrative configuration of virtual hosts and applications. Synchronizing configuration between systems as cluster membership changes.

Application Coordinator 423—Responsible for executing administrative commands, and synchronizing tunnel configuration with the Cluster Monitor. This component is responsible for maintaining the configuration, which describes a list of tunnels to be maintained across the cluster.

In addition to servicing TCP connection tunnels, ordered, reliable communication channels provided by the Pipe Router and State Machine of the present invention are necessary for components internal to the Cluster Monitor, such as the Cluster Service State Machine and the Command State Machine. A Pipe Router communication channel is used to send commands to other servers in the cluster, to send responses back to command issuers, and to synchronize configuration. An entry in the Application Coordinator's tunnel configuration table contains:

Destination gateway name—Identifying the cluster member that will operate the destination tunnel gateway Destination target address and port—Identifies the host to which the destination gateway will establish new tunnel connections One or more origins, including:

Origin gateway name—Cluster member that will operate the origin tunnel gateway

Origin listening address and port—Describes how the listening TCP port for the origin gateway will be created Turning again to FIG. 4*c*, the TCP Tunnel Listener Block and Pipe Listener Block components of the Cluster Monitor 410 and Tunnel Endpoint Manager 419 can be seen as they internally utilize a Tunnel Session component. The tunnel session represents an individual established connection, and includes a TCP listening socket 470 and a Pipe Router socket 476. A Tunnel Session 471 is created by a listener block for each connection that it accepts on its listening socket, and each listener block contains a set of Tunnel Sessions that it has created. The Tunnel Session component has two main responsibilities. These responsibilities include:

Forward data received on one socket to the other socket. As data is received from the TCP socket 472, it is sent to the pipe socket 474, and vice-versa. This also includes the possibility of quenching reception on one side when the other side is not accepting data as quickly as it is coming in.

Manage end-of-file and socket closure. Either side can initiate a close, and not necessarily at the same time. A closure event received on one socket must be forwarded to the other, and when both sides have completed closure, the tunnel session can be discarded.

The Intermediary Registry Server (or module) 450, apart from the cluster but nonetheless coupled to the cluster via the public Internet, enables geographically separated servers to form a server cluster using UDP rather than a more traditional VPN. The registry service components include:

- Membership List Manager 452—maintains list of known servers that are in contact, the groups they claim to belong to, and informs other servers of the same group of changes to the group. Also handles invitation requests for cluster formation and the addition of new servers.
- DTLS session manager 454—responsible for establishing DTLS sessions with servers acting as clients. Not used for authentication, but for nominal message privacy.
- Connection log manager 456—when enabled, maintains a log of which servers have been in contact, when contact is established, and when contact is lost. Used for potential metering and billing purposes.
- Configuration manager 458—maintains configuration of the matchmaking service, including which addresses it should be listening on, and a server blacklist.

The methodology for configuring a new tunnel in the formation of a server cluster according to one embodiment of the present invention includes:

1. Sending, by the Cluster Coordinator a request to the destination gateway server to create the pipe listener block 476. The pipe listener block 476 will be configured to listen 474 on a random pipe port, and connect to the destination target address—the target server application for the tunnel.
2. The destination gateway server responds with the pipe port on which the listener block is bound.
3. Cluster coordinator thereafter sends requests to all origin gateway servers to create TCP listener blocks 470. The TCP listener blocks are configured to connect to the destination gateway server on the pipe port determined in step (2).

The pipe router and state machine provide connection-oriented, ordered, reliable-delivery message channels, and operates the message channels over an unreliable, out-of-order datagram message channel. The pipe router and state machine also provide connection listening and connection establishment messages, over a namespace of numeric ports, similar to TCP.

Datagram messages generated by the pipe router and state machine are encapsulated by the Datagram Transport Layer Security ("DTLS") protocol using a DTLS session manager 412 that provides security. DTLS allows the tunnel gateway components to authenticate each other using public-key cryptography, and encrypts datagrams for message privacy. By using this level of security, interception, spoofing, and message alteration attacks are prevented as messages traverse the public Internet. One of reasonable skill in the relevant art will recognize that DTLS may be substituted for any similar network security layer that provides server authentication and message secrecy.

Datagram messages encapsulated by DTLS are exchanged between gateway tunnel applications and components over UDP. UDP communication channels are then established either using known addresses listed in a route index 464, or using endpoint discovery via an intermediary registry server 450 as shown in FIG. 4a.

The present invention is, in essence, an interaction between a gateway origin tunnel application and a gateway destination tunnel application. However, the invention does not limit communication to a pair of gateway servers. In addition to a simple point-to-point tunnel, the invention also allows for tunnels with a single destination, multiple origins, and multiple tunnels per gateway server. The pipe router and state machine, DTLS, and UDP transport components used to form a link between tunnel gateway servers of the present invention, described above and in subsequent sections, can be used to form a cluster of tunnel gateway servers.

One feature of the present invention is that it interacts with the host networking stack using only layer-4 TCP and UDP sockets, and does not require a layer-2 or layer-3 VPN driver. While the client application would typically be configured to connect to the host on which the server application runs, in accordance with the present invention, the client application will instead be configured to connect to the host with the tunnel origin point. The Cluster Monitor component (described herein) retains a listening TCP socket for the tunnel origin. Upon accepting a new TCP connection, the Cluster Monitor component initiates a pipe connection to a remote Cluster Monitor by sending an appropriate message over its UDP channel, and upon successful connection, transfers data back and forth as it arrives.

TCP connection tunneling is particularly useful when parts of the application are connected by incongruent or otherwise encumbered networks, such as NAT routers and restrictive firewalls, provided that the tunnel gateways are able to find a message channel. The present invention accomplishes TCP connection tunneling by forwarding accepted TCP connections from an origin tunnel gateway application, using its pipe router and state machine component, to the gateway destination tunnel application, and finally as outbound TCP connections to the target application.

TCP connection tunneling has security advantages when compared to other methods of network access. By way of example, a client trying to connect to a private server hosted by a cloud provider can use two widely accepted methods of making the server available. Typically, in this scenario, both the client and the server are connected to the internet via NAT routers, and direct addressing is not possible.

The present invention uses TCP tunneling and a dedicated UDP channel over the public Internet to connect a client application resident on an origin server with a server application resident on a destination server. Data generated by the client application is transformed or packaged to a UDP transport suitable format from a TCP transport format, transmitted over the Internet via a private and secure UDP datagram-orientated communication channel and then repackaged back to a TCP transport suitable format for delivery to the server application.

Included hereafter are flowcharts depicting examples of the methodology may be used for TCP tunneling over a public Internet. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Figure 5:
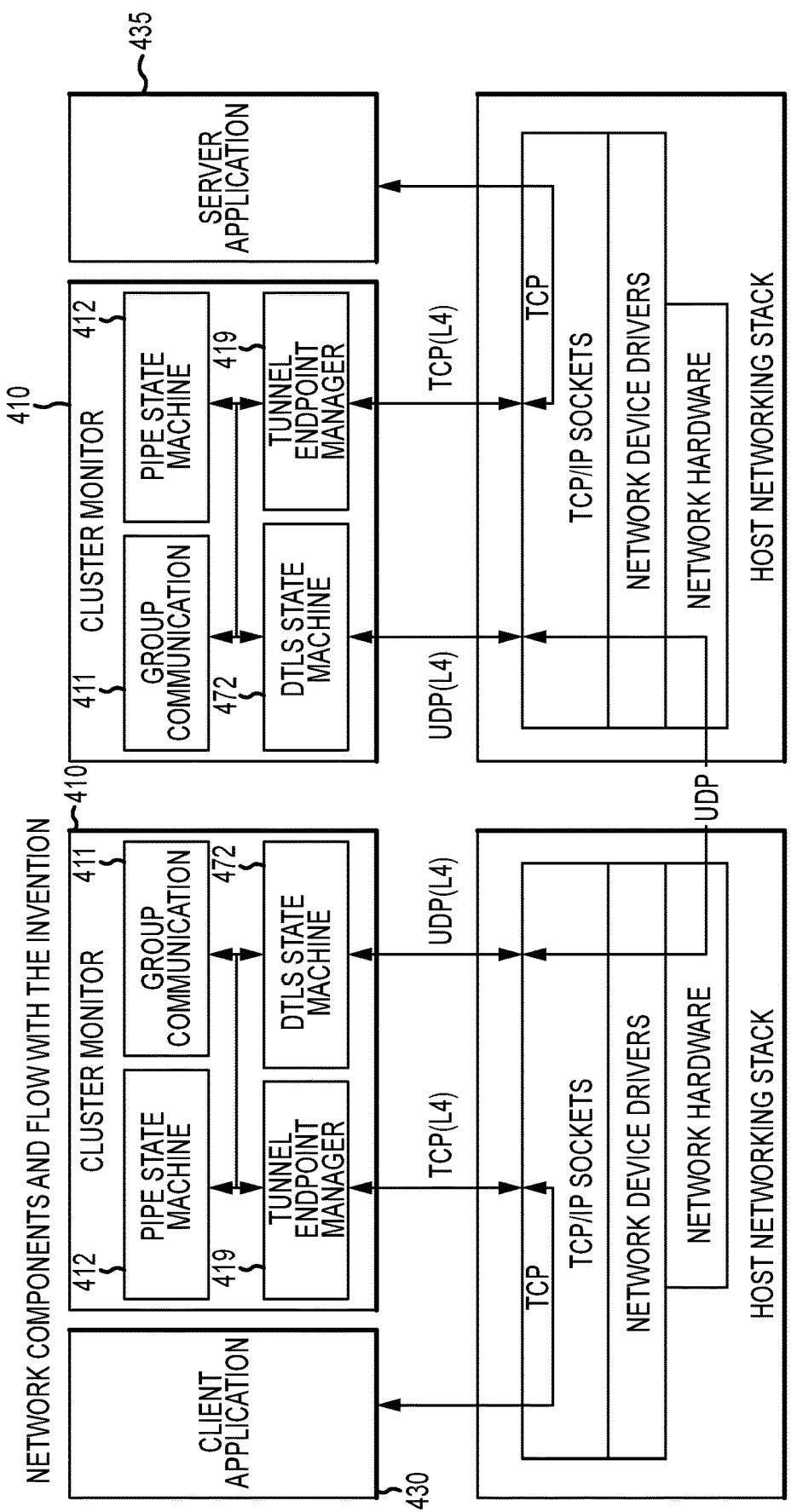
FIG. 5 is a network flow diagram of a process for terminal control protocol tunneling and client application data forwarding via a secure UDP channel, according to one embodiment of the present invention.
Figure 6:
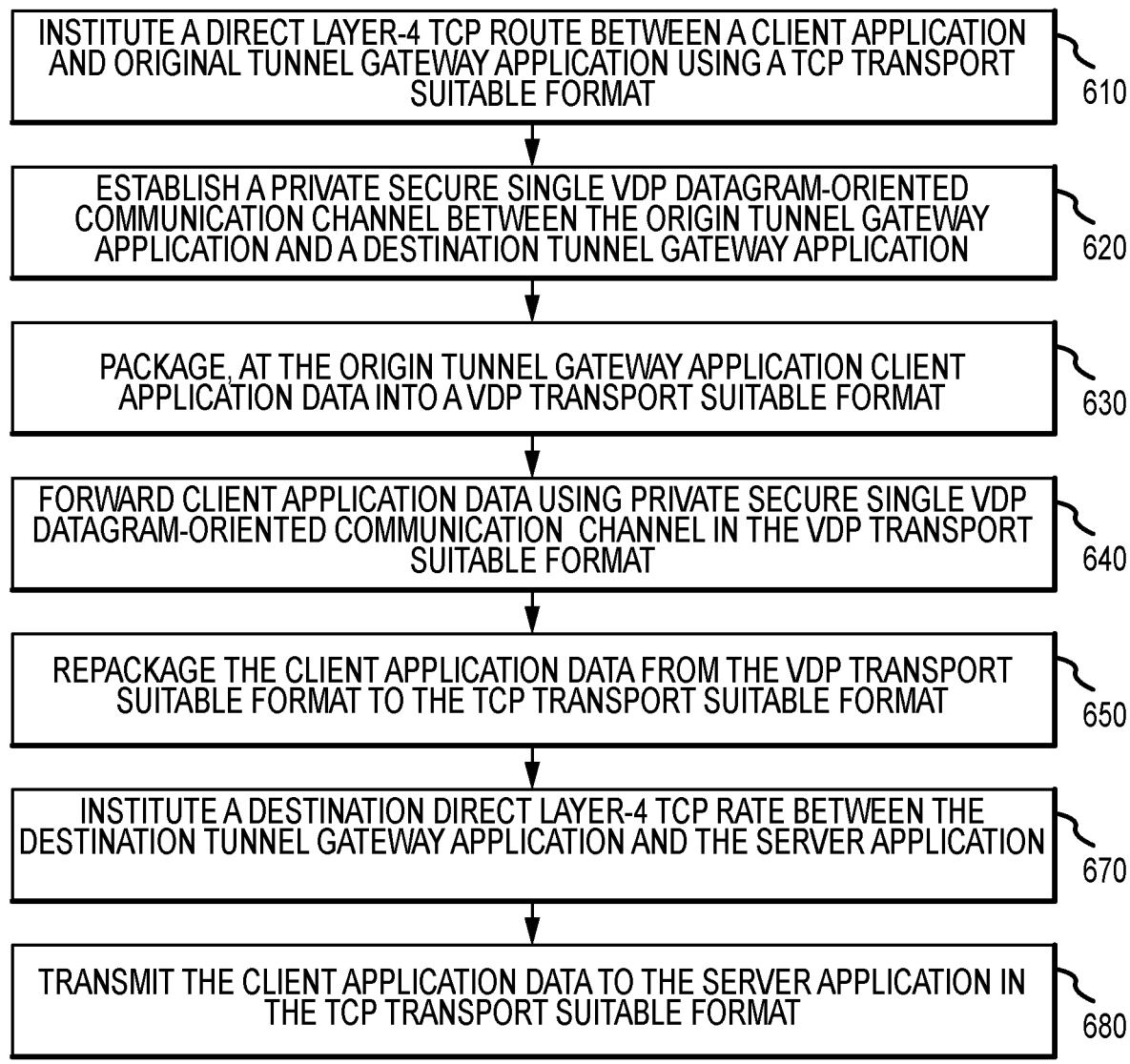
FIG. 6 is a flowchart for a methodology for terminal control protocol tunneling and forwarding of client application data, according to one embodiment of the present invention.

A process for TCP tunneling over a public Internet, according to one embodiment of the present invention and with reference to FIGS. 5 and 6, begins with instituting 610 a direct layer-4 TCP network route between a client application 510 residing on an origin server and a origin tunnel gateway application. The tunnel gateway application, which is, in one embodiment resident within the components of the cluster monitor 410, drives the tunnel endpoint manager 419, pipe router and state machine 412 and group communication module 411 along with the DTLS state machine 472 of the peer route 470, identified in the rate index 464, to establish 620 a private and secure single UDP datagram orientated communication channel, (local UDP and remote UDP endpoint 474, 476) between the origin tunnel gateway application (cluster monitor) and a destination tunnel gateway application. In other embodiments the original tunnel gateway application and/or the destination tunnel gateway application may reside on separate servers, such as an origin gateway server and a destination gateway server.

Client data delivered to the origin tunnel gateway application in a TCP transport suitable format packaged 630 into a UDP datagram orientated communication format and forwarded 640 from the origin tunnel gateway application to the destination tunnel gateway application. The information is secured using. DTSL communication protocols.

Upon arrival, the UDP datagram orientated communication suitable client data is repackaged 650 or transformed, back to a TCP transport suitable format. The destination tunnel gateway application thereafter institutes 670 a direct layer-4 network route to the server application residing on a destination server to which client application data is transmitted 680 in the TCP transport suitable format.

As described above the pipe state machine and the group communication module of the cluster monitory (origin tunnel gateway application) can include multiple listening TCP sockets configured to accept a plurality of application connections. Each connection is a secure direct application-to-application connection. And responsive to a new connection begin accepted by a listening TCP socket, the pipe router and connection state machine, both residing on the origin tunnel gateway application, can signal to the destination tunnel gateway application to initiate a new outbound TCP connection to the (or other) server application(s). And each of the transmissions is encapsulated using DTLS protocols.

Figure 7A:
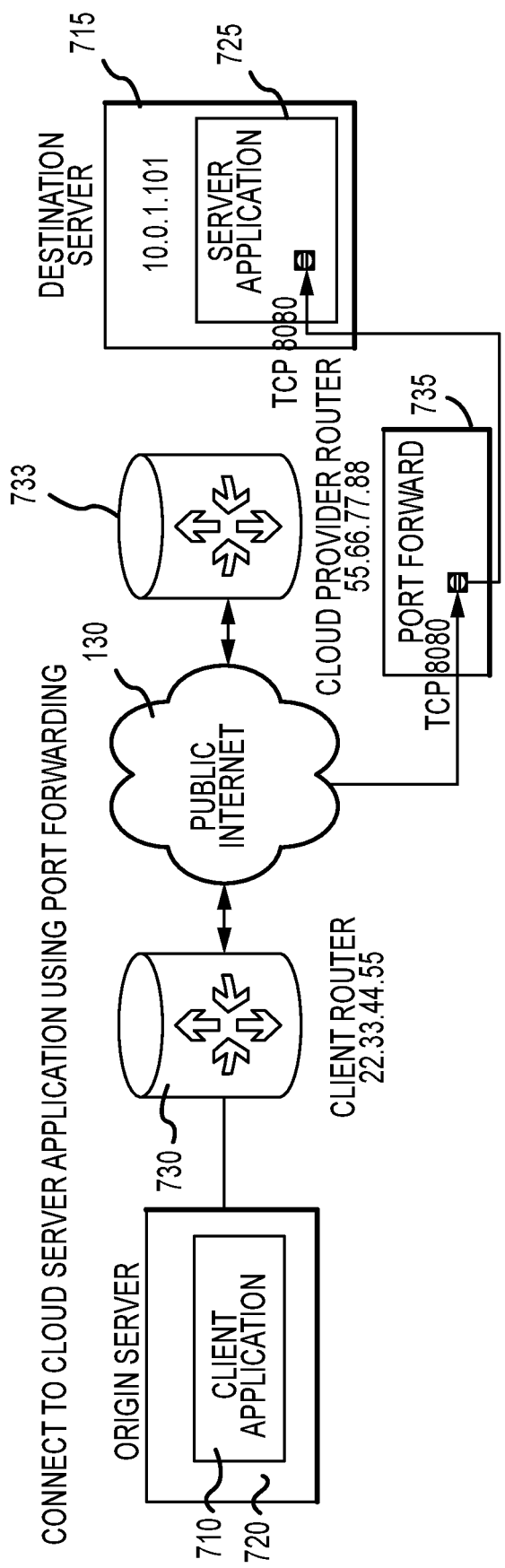

The present invention may be implemented in a variety of configurations. The most common method of allowing a client application 710 resident on an origin server 720 to access a destination server 715 and a destination server application 725 is to configure the NAT router 730 to forward a publicly accessible TCP port 735 to the internal server application 725 as shown in FIG. 7a. With this method, the client application must be configured to connect to the public address of the destination NAT router 733 on the appropriately forwarded port. This method is simple, provided that the NAT router configuration can be easily changed, and provides access only to the server application. However, this approach will also make available the forwarded TCP port to the entire public Internet, which can be a security concern for sensitive server applications.

The present invention's TCP connection tunneling shown in FIG. 7b provides a greater degree of isolation, by providing the client application 710 with access to the server application 725 and only the server application 725, and also not creating the possibility of access to the client application 710 or client application data from the public Internet 130. With this method, the client application 710 is configured to connect to the local server (origin gateway) 740 on an appropriately forwarded port, repackage application data into a suitable UDP format and forward encapsulated data through a single UDP datagram-oriented communication channel. Upon its arrival at the destination tunnel gateway 750 the data is thereafter repackaged and securely delivered to the destination server application.

The present invention also facilitates direct communication between two servers and their applications in situations where one server sits behind a symmetric NAT, as long as the other server does not also sit behind a symmetric NAT. This is enabled by bidirectional attempts to initiate communication, where the outbound attempt from the server behind the non-symmetric NAT may be blocked by the symmetric NAT, but the outbound attempt of the server behind the symmetric NAT will not be blocked by the non-symmetric NAT.

The invention described herein uses datagram-oriented UDP protocol for communication between tunnel gateways through which it can forward TCP application data. Endpoint discovery is substantially more reliable using UDP and UDP allows for more accurate assessment of the state of peer servers, as every message received from a peer is processed by a component of the invention. In a TCP approach, the host networking stack will not inform the application of any message that does not contain the next unreceived data block. The described concept specifies the use of a single UDP port for all styles of communication between servers, as well as with the matchmaking service. This supports the goal of reliable endpoint discovery and application data forwarding.

Upon reading this disclosure, those of skill in the art will appreciate still additional alternative structural and functional designs for a system and a process for TCP/UDP tunneling through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope of the present invention.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

In a preferred embodiment, the present invention can be implemented in software. Software programming code which embodies the present invention is typically accessed by a microprocessor from long-term, non-transitory persistent storage media of some type, such as a flash drive or hard drive. The software programming code may be embodied on any of a variety of known media for use with a data processing system, such as a diskette, hard drive, CD-ROM, or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, servers, minicomputers, mainframe computers, and the like. The invention is preferably practiced in distributed computing environments where tasks are performed by remote processing devices that are linked through a communications network. In a distributed computing environment, program modules may be located in both local and remote memory storage devices.

An exemplary system for implementing the invention includes a general purpose computing device such as the form of a conventional computer, a communication device or the like, including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random access memory (RAM). A basic input/output system (BIOS), containing the basic routines that help to transfer information between elements within the personal computer, such as during start-up, is stored in ROM. The computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

While there have been described above the principles of the present invention in conjunction with a method and system for transmission control protocol tunneling, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A computer implemented method for transmission control protocol tunneling, the method comprising:
   instituting a origin direct layer-4 Terminal Control Protocol (TCP) network route between a client application residing on an origin server and an origin tunnel gateway application residing on an origin gateway whereby client application data is transmitted to the origin tunnel gateway application using a TCP transport suitable format;
   establishing a private and secure single User Datagram Protocol (UDP) datagram-orientated communication channel between the origin tunnel gateway application residing on the origin gateway and a destination tunnel gateway application residing on a destination gateway;
   packaging, at the origin tunnel gateway application, client application data into a UDP transport suitable format;
   forwarding, using the private and secure single UDP datagram-orientated communication channel, client application data from the origin tunnel gateway application to the destination tunnel gateway application using UDP;
   repackaging, at the destination tunnel gateway application, client application data into the TCP transport suitable format; and
   instituting, a destination direct layer-4 network TCP route between the destination tunnel gateway application residing on the destination gateway and a server application residing on a destination server whereby client application data is thereafter transmitted to the server application using TCP.

2. The computer implemented method for transmission control protocol tunneling according to claim 1, wherein the origin tunnel gateway application includes one or more listening TCP sockets configured to accept application connections.

3. The computer implemented method for transmission control protocol tunneling according to claim 2, wherein each connection accepted by the origin tunnel gateway application constitutes a separate communication session resulting in a separate TCP connection between the origin tunnel gateway application and the client application.

4. The computer implemented method for transmission control protocol tunneling according to claim 3, responsive to a new connection being accepted by a listening TCP socket, signaling, by a pipe router and by a connection state machine both residing on the origin tunnel gateway application, to the destination tunnel gateway application to initiate a new outbound TCP connection to the server application.

5. The computer implemented method for transmission control protocol tunneling according to claim 4, wherein the pipe router and the connection state machine encapsulate messages using Datagram Transport Layer Security (DTLS) protocols.

6. The computer implemented method for transmission control protocol tunneling according to claim 4, responsive to the new outbound TCP connection to the server application being connected, further comprising transferring client application data between the client application on the origin server with the server application on the destination server via the private and secure single User Datagram Protocol (UDP) datagram-orientated communication channel.

7. The computer implemented method for transmission control protocol tunneling according to claim 1, wherein the client application access is limited to the server application and wherein server application access is limited to the client application.

8. The computer implemented method for transmission control protocol tunneling according to claim 1, wherein the origin tunnel gateway application and the destination tunnel gateway application manage one or more tunnel connections between the client application and the server application.

9. The computer implemented method for transmission control protocol tunneling according to claim 8, wherein each tunnel connection may be with a unique application.

10. A non-transitory machine-readable storage medium having stored thereon instructions for performing a method, comprising machine executable code, which when executed by at least one machine, causes the machine to:
institute an origin direct layer-4 Terminal Control Protocol (TCP) network route between a client application residing on an origin server and an origin tunnel gateway application residing on an origin gateway whereby client application data is transmitted to the origin tunnel gateway application using a TCP transport suitable format;
establish a private and secure single User Datagram Protocol (UDP) datagram-orientated communication channel between the origin tunnel gateway application residing on the origin gateway and a destination tunnel gateway application residing on a destination gateway;
package, at the origin tunnel gateway application, client application data into a UDP transport suitable format;
forward, using the private and secure single UDP datagram-orientated communication channel, client application data from the origin tunnel gateway application to the destination tunnel gateway application using UDP;
repackage, at the destination tunnel gateway application, client application data into the TCP transport suitable format; and
institute a destination direct layer-4 network TCP route between the destination tunnel gateway application residing on the destination gateway and a server application residing on a destination server whereby client application data is transmitted to the server application using TCP.

11. The non-transitory machine-readable storage medium of claim 10, wherein the origin tunnel gateway application includes one or more listening TCP sockets configured to accept client application connections.

12. The non-transitory machine-readable storage medium of claim 11, wherein each connection accepted by the origin gateway application constitutes a separate communication session resulting in a separate TCP connection between the origin tunnel gateway application and the client application.

13. The non-transitory machine-readable storage medium of claim 12, responsive to a new connection being accepted by a listening TCP socket, further comprising machine executable code which causes the machine to signal, by a pipe router and by a connection state machine both residing on the origin tunnel gateway application, to the destination tunnel gateway application to initiate a new outbound TCP connection to the server application.

14. The non-transitory machine-readable storage medium of claim 13, wherein the pipe router and the connection state machine encapsulate messages using Datagram Transport Layer Security (DTLS) protocols.

15. The non-transitory machine-readable storage medium of claim 13, responsive to the new outbound TCP connection to the server application being connected, further comprising machine executable code which causes the machine to transfer client application data between the client application on the origin server with the server application on the destination server via the private and secure single User Datagram Protocol (UDP) datagram-orientated communication channel.

16. The non-transitory machine-readable storage medium of claim 10, further comprising machine executable code which causes the machine to limit access of the client application to the server application and limit access of the server application to the client application.

17. The non-transitory machine-readable storage medium of claim 11, wherein the origin tunnel gateway and the destination tunnel gateway manage one or more tunnel connections between the client application and the server application.

18. The non-transitory machine-readable storage medium of claim 17, wherein each tunnel connection may be with a unique application.

19. A computer system for transmission control protocol tunneling, the computer system comprising:
a machine capable of executing instructions embodied as software; and
a non-transitory storage media housing a plurality of software portions, wherein one of said software portions is configured to
institute a origin direct layer-4 Terminal Control Protocol (TCP) network route between a client application residing on an origin server and an origin tunnel gateway application residing on an origin gateway whereby client application data is transmitted to the origin tunnel gateway application using a TCP transport suitable format;

establish a private and secure single User Datagram Protocol (UDP) datagram-orientated communication channel between the origin tunnel gateway application residing on the origin gateway and a destination tunnel gateway application residing on a destination gateway;

package, at the origin tunnel gateway application, client application data into a UDP transport suitable format;

forward, using the private and secure single UDP datagram-orientated communication channel, client application data from the origin tunnel gateway application to the destination tunnel gateway application using UDP;

repackage, at the destination tunnel gateway application, client application data into the TCP transport suitable format; and institute, a destination direct layer-4 network TCP route between the destination tunnel gateway application residing on the destination gateway and a server application residing on a destination server whereby client application data is transmitted to the server application using TCP.

20. The computer system of claim 19, wherein the origin tunnel gateway application includes one or more listening TCP sockets configured to accept client application connections.

21. The computer system of claim 20, wherein each connection accepted by the origin gateway application constitutes a separate communication session resulting in a separate TCP connection between the origin tunnel gateway application and the client application.

22. The computer system of claim 21, responsive to a new connection being accepted by a listening TCP socket, further comprising a software portion configured to signal, by a pipe router and by a connection state machine both residing on the origin tunnel gateway application, to the destination tunnel gateway application to initiate a new outbound TCP connection to the server application.

23. The computer system of claim 22, wherein the pipe router and the connection state machine encapsulate messages using Datagram Transport Layer Security (DTLS) protocols.

24. The computer system of claim 22, responsive to the new outbound TCP connection to the server application being connected, further comprising a software portion configured to transfer client application data between the client application on the origin server with the server application on the destination server via the private and secure single User Datagram Protocol (UDP) datagram-orientated communication channel.

25. The computer system of claim 19, further comprising a software portion configured to limit access of the client application to the server application and limit access of the server application to the client application.

* * * * *